United States Patent
O'Gorman et al.

(10) Patent No.: US 12,233,743 B1
(45) Date of Patent: Feb. 25, 2025

(54) SYSTEMS AND METHODS FOR ENABLING ENERGY TRANSFER FROM A VEHICLE TO BUILDING

(71) Applicant: Ford Global Technologies, LLC, Dearborn, MI (US)

(72) Inventors: Ryan O'Gorman, Beverly Hills, MI (US); Stuart C. Salter, White Lake, MI (US); Peter Phung, Windsor (CA); Brendan Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/487,397

(22) Filed: Oct. 16, 2023

(51) Int. Cl.
*B60L 55/00* (2019.01)
*H02J 7/00* (2006.01)

(52) U.S. Cl.
CPC ............ *B60L 55/00* (2019.02); *H02J 7/0048* (2020.01); *B60L 2240/70* (2013.01); *H02J 2310/12* (2020.01)

(58) Field of Classification Search
CPC .......... B60L 55/00; Y04S 10/126; H02J 3/322
See application file for complete search history.

(56) References Cited

U.S. PATENT DOCUMENTS

| | | | |
|---|---|---|---|
| 8,872,379 B2 | 10/2014 | Ruiz et al. | |
| 9,026,347 B2 | 5/2015 | Gadh et al. | |
| 2013/0179061 A1* | 7/2013 | Gadh | B60L 53/305 701/1 |
| 2015/0039391 A1* | 2/2015 | Hershkovitz | G01R 31/382 705/7.31 |
| 2017/0050529 A1 | 2/2017 | Lambert et al. | |
| 2019/0061535 A1 | 2/2019 | Bridges et al. | |
| 2024/0014660 A1* | 1/2024 | Lu | B60L 53/62 |

FOREIGN PATENT DOCUMENTS

KR 20210154148 A 12/2021

OTHER PUBLICATIONS

A. Can Duman, et al., A Home Energy Management System With an Integrated Smart Thermostat for Demand Response in Smart Grids, Sustainable Cities and Society 65 (2021) 102639, Dec. 3, 2020, pp. 4-20.

\* cited by examiner

*Primary Examiner* — Daniel Cavallari
(74) *Attorney, Agent, or Firm* — Emily Drake; Eversheds Sutherland (US) LLP (57) ABSTRACT

A system to enable energy transfer from a vehicle to a building is disclosed. The system may include a memory, a transceiver and a processor. The memory may be configured to store a load profile associated with a building component. The transceiver may be configured to receive temperature information and vehicle information associated with the vehicle. The processor may obtain the temperature information, the load profile and the vehicle information. The processor may further determine an estimated amount of energy required to operate the building component based on the temperature information and the load profile. Furthermore, the processor may estimate a vehicle range based on the estimated amount of energy and the vehicle information and output the vehicle range on a user interface.

20 Claims, 6 Drawing Sheets

SYSTEMS AND METHODS FOR ENABLING ENERGY TRANSFER FROM A VEHICLE TO BUILDING

FIELD

The present disclosure relates to systems and methods for enabling energy transfer from a vehicle to a building to operate a heating, ventilation, and air conditioning (HVAC) system of the building.

BACKGROUND

Bi-directional Electric Vehicles (EVs) are configured to receive as well as supply energy to a charger. The bi-directional energy transfer feature enables the EVs to supply energy to other vehicles, buildings, equipment, etc. For example, an EV may supply energy from an EV battery to a building (e.g., a house), when the building requires excess energy and the power grid may not be able to meet the building's energy requirements. The EV may also supply energy to the building to optimize consumer's spend on energy obtained from the power grid, e.g., during those time durations of the day when charges for the energy drawn from the power grid may be high.

To optimally supply energy from the vehicle to the building without considerably affecting vehicle's performance, it is important to know an effect of energy transfer on vehicle's operational parameters. This is especially important when the energy from the vehicle may be used to operate a heating, ventilation, and air conditioning (HVAC) system of the building, as HVAC systems typically draw considerable energy.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a vehicle energy transfer system ("system") for enabling energy transfer from one or more vehicles (e.g., a first vehicle and a second vehicle) to a building. The first and second vehicles may be bi-directional Electric Vehicles (EVs) that may be configured to receive as well as supply energy to the building via a charger point. In some aspects, the system may specifically enable energy transfer from the first vehicle and/or the second vehicle to the building to operate a heating, ventilation, and air conditioning (HVAC) system of the building.

To enable the first vehicle (and/or the second vehicle) to efficiently transfer energy to the building, the system may obtain temperature information associated with the building and ambient environment, vehicle information associated with the first vehicle, and an HVAC system load profile. The temperature information may include a set point or user desired temperature for the building, a real-time building temperature and ambient temperature. The vehicle information may include a real-time vehicle battery state of charge (SoC) level and information associated with an amount of vehicle energy required to travel per-unit distance (e.g., one mile). The HVAC system load profile may be indicative of an amount of energy required to operate the HVAC system at a specific set point temperature, a specific building temperature and a specific ambient temperature.

Responsive to obtaining the information described above, the system may determine an estimated amount of energy required to operate the HVAC system based on the temperature information and the HVAC system load profile. The system may further estimate a remaining vehicle range (or vehicle range) associated with the first vehicle based on the estimated amount of energy and the vehicle information, when the first vehicle may be providing energy to the building to operate the HVAC system. Responsive to determining/estimating the amount of energy and the vehicle range, the system may determine whether the amount of energy is greater than a predefined maximum energy threshold and/or the vehicle range is less than a predefined minimum vehicle range threshold. When any of these conditions are met, the system may output a notification to a user device or a vehicle Human-Machine Interface (HMI) requesting a user to modify (e.g., reduce) the set point temperature, or the system may automatically reduce the set point temperature.

The system may further output the estimated vehicle range and the set point temperature on a user interface associated with the user device, the vehicle HMI and/or a building thermostat. The user may view the vehicle range and the set point temperature on the user interface and may update the set point temperature at any time during the energy transfer operation from the first vehicle to the building, based on user's requirement for the set point temperature and the vehicle range. In some aspects, the user may include a feature (e.g., a slider or a dial) that may enable the user to conveniently modify the set point temperature on the user interface and view an effect of the modified set point temperature on the remaining vehicle range.

In some aspects, when both the first vehicle and the second vehicle may be simultaneously providing energy to the building to operate the HVAC system, the system may estimate remaining vehicle ranges for both the vehicles based on a "split" of the total energy being transferred to the building between the first vehicle and the second vehicle. In this case, the system may output the vehicle ranges for both the vehicles and the split, along with the set point temperature, on the user interface. Based on user's requirements for the set point temperature and/or the vehicle ranges for the first and second vehicles, the user may modify the set point temperature and/or the split on the user interface.

The present disclosure discloses a vehicle energy transfer system that enables the user to view an effect of the set point temperature on the vehicle range associated with the vehicle that may be providing energy to the building. Based on the displayed set point temperature and the remaining vehicle range, the user may make an informed decision of adjusting the set point temperature. The system further enables the user to adjust the split of energy transfer between two or more vehicles, when such vehicles may be simultaneously providing energy to the building to operate the HVAC system.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
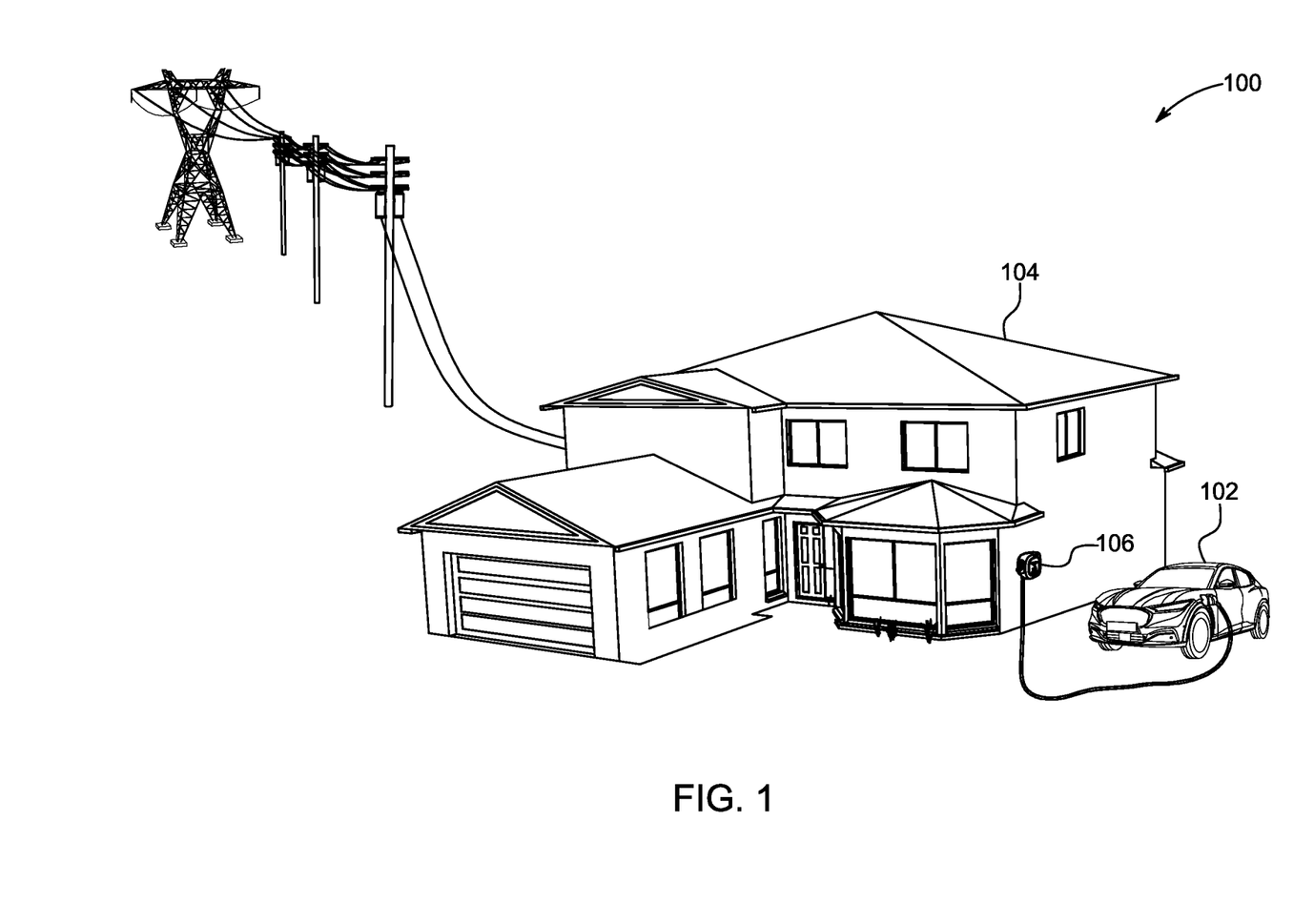
FIG. 1 depicts an example environment in which techniques and structures for providing the systems and methods disclosed herein may be implemented.

FIG. 1 depicts an example environment 100 in which techniques and structures for providing the systems and methods disclosed herein may be implemented. The environment 100 may include a vehicle 102 and a building 104 (or a house 104). The vehicle 102 may take the form of any passenger or commercial vehicle such as, for example, a car, a work vehicle, a crossover vehicle, a truck, a van, a minivan, a taxi, a bus, etc. The vehicle 102 may be a manually driven vehicle and/or may be configured to operate in a partially or fully autonomous mode. In some aspects, the vehicle 102 may be a bi-directional Electric Vehicle (EV) that may be configured to receive and supply energy from/to other vehicles, chargers, buildings, equipment, and/or the like. In an exemplary aspect, the vehicle 102 may be configured to supply energy to the house 104 via a charger point 106, which may be installed in the house 104 (as shown in FIG. 1) or anywhere in proximity to the house 104.

The house 104 may include one or more house equipment that may be powered by energy drawn from utility power grid and/or the vehicle 102. Examples of house equipment include, but are not limited to, a heating, ventilation, and air conditioning (HVAC) system (shown as HVAC 212 in FIG. 2), fans, lights, electronic equipment, and/or the like. In some aspects, the vehicle 102 may supply energy to the house 104 to power the house equipment (e.g., the HVAC system) when the energy requirements of the house 104 may be greater than the energy that the power grid may provide, or when charges for energy drawn from the power grid may be high, or when a house/vehicle owner requests (via a user device) the vehicle 102 to supply energy to the house 104. For example, a vehicle or house owner may request the vehicle 102 to supply energy to the house 104 to operate a first house component (e.g., the HVAC system) during morning time when the charges for energy used from the power grid may be high and may enable the HVAC system to operate via the energy drawn from the power grid during afternoons when the corresponding charges may be low.

The scenarios described above for supplying energy from the vehicle 102 to the house 104 are exemplary in nature and for illustrative purpose only. The described scenarios should not be construed as limiting. The vehicle or house owner may request the vehicle 102 to supply energy to the house 104 at any time, based on user requirements and/or energy supply or requirement conditions.

In some aspects, the house 104 may include a thermostat (or a second house component, shown as thermostat 210 in FIG. 2) that may be configured to control HVAC system operation, measure a real-time house interior portion temperature (or house temperature associated with the house 104), and enable a user (e.g., the house owner) to control the house temperature. For example, the user may input a set point temperature associated with the house 104 on the thermostat. The set point temperature may be, for example, a temperature desired by the user for the house 104. The thermostat may be configured to activate and/or deactivate the HVAC system based on the house temperature and the set point temperature. For example, the thermostat may switch ON the Air Conditioner (AC) when the house temperature may be higher than the set point temperature and may switch OFF the AC when the house temperature may be lower than or equivalent to the set point temperature.

The vehicle 102 may be communicatively coupled with the thermostat and may be configured to obtain the house temperature and the set point temperature from the thermostat. The vehicle 102 may be further configured to control HVAC system operation via the thermostat. For example, the vehicle 102 may transmit command signals to the thermostat to switch ON or OFF the HVAC system to optimize the supply of energy from the vehicle 102, when the vehicle 102 may be supplying energy to the house 104.

To ensure vehicle's operational efficiency, it may be convenient and beneficial for the user to know how the set point temperature input by the user on the thermostat may affect vehicle's operational parameters, e.g., vehicle's range. A person ordinarily skilled in the art may appreciate that considerable vehicle energy may be required to operate the HVAC system when the house temperature (and/or ambient temperature in a geographical area including the house 104) may be high and the set point temperature may be low. In such a scenario, the vehicle 102 may be required to transfer considerable amount of energy to the house 104 to operate the HVAC system, which may affect (e.g., reduce) the vehicle's range. On the other hand, if the user increases the set point temperature to be slightly higher, the vehicle 102 may be required to transfer lesser amount of energy to the house 104 to operate the HVAC system, which may have a reduced effect on vehicle's range.

To make the user aware of the effect of the set point temperature input by the user on the vehicle's range, the vehicle 102, the HVAC system and the thermostat may be communicatively coupled with a vehicle energy transfer system (shown as vehicle energy transfer system 200 in FIG. 2) that may be hosted on a server (or be part of the vehicle 102) and configured to determine and output an expected vehicle range based on the set point temperature input by the user on the thermostat. The user may view the expected vehicle range output by the vehicle energy transfer system ("system") and may decide to modify the set point temperature based on the expected vehicle range and expected vehicle usage in the future. For example, if the user inputs a set point temperature of 68 degrees Fahrenheit, the system may output the expected vehicle range of 120 miles. If the user desires to have more vehicle range based on the expected vehicle usage in the future (e.g., when the user may require to drive the vehicle 102 after the vehicle 102 transfers the energy to the house 104), the user may increase the set point temperature (e.g., to 75 degrees Fahrenheit). Responsive to the user increasing the set point temperature, the system may output an updated vehicle range (e.g., 200 miles). The user may fix a set point temperature based on a vehicle range that the user may desire. In this manner, the system enables the user to tradeoff between house temperature comfort level and expected vehicle range. Stated another way, the system facilitates the user to make an informed decision with respect to the set point temperature of the house 104 input by the user on the thermostat by making the user aware of the effect of the set point temperature on the vehicle range.

In some aspects, to determine the expected vehicle range based on the set point temperature, the system may obtain temperature information, vehicle information and a load profile associated with the HVAC system (or HVAC load profile). The temperature information may include the set point temperature associated with the house 104 input by the user on the thermostat, a real-time house temperature and ambient temperature in the geographical area including the house 104. The system may obtain the set point temperature and the house temperature from the thermostat, and the system may obtain the ambient temperature from an ambient temperature sensor associated with the vehicle 102 (or from a server providing weather condition information to the system).

The vehicle information may include a real-time vehicle battery state of charge (SOC) associated with the vehicle 102 and information associated with an amount of vehicle energy required to travel a per-unit distance (e.g., an amount of vehicle energy required to travel one mile). The system may obtain the vehicle information from the vehicle 102. In some aspects, the vehicle may determine the information associated with the amount of vehicle energy required to travel the per-unit distance based on historical driving/travel pattern associated with the vehicle 102 and may store the determined information in a vehicle memory (shown as vehicle memory 220 in FIG. 2). In this case, the system may obtain the information associated with the amount of vehicle energy required to travel the per-unit distance from the vehicle memory.

In some aspects, the system may obtain the HVAC load profile from an external server or the vehicle 102. In other aspects, the HVAC load profile may be pre-stored in a system memory (shown as system memory 238 in FIG. 2). The HVAC load profile may be indicative of an expected load or energy that the HVAC system may draw from the vehicle 102 at a specific set point temperature, a specific ambient temperature and a specific house temperature. For example, the HVAC load profile may indicate an expected energy (e.g., a first energy amount) that the HVAC system may draw from the vehicle 102 to cool a house temperature of 80 degrees Fahrenheit to a set point temperature of 75 degrees Fahrenheit, when the ambient temperature may be 85 degrees Fahrenheit. As another example, the HVAC load profile may indicate an expected energy (e.g., a second energy amount) that the HVAC system may draw from the vehicle 102 to cool a house temperature of 85 degrees Fahrenheit to a set point temperature of 75 degrees Fahrenheit, when the ambient temperature may be 90 degrees Fahrenheit.

A person ordinarily skilled in the art may appreciate that the first energy amount described above may be different from the second energy amount, as the HVAC system may require more energy to cool the house 104 when the ambient temperature and/or the house temperature may be high. In some aspects, the HVAC load profile may also depend on the house 104, e.g., a type of insulation in the house 104, a house location (e.g., height above sea-level), typical humidity level in a geographical area where the house 104 may be located, and/or the like.

Responsive to obtaining the temperature information, the vehicle information the HVAC load profile described above, the system may determine an estimated amount of energy that may be required to be drawn from the vehicle 102 to operate the HVAC system based on the temperature information and the HVAC load profile. Further, the system may calculate/estimate a remaining vehicle range (or vehicle range) based on the estimated amount of energy and the vehicle information. Stated another way, the system may determine the vehicle range based on the estimated amount of energy that the HVAC system may draw from the vehicle 102 and a current or real-time vehicle battery SOC and the amount of vehicle energy required to travel per-unit distance.

In some aspects, the system may additionally obtain vehicle's time duration availability (or vehicle availability) to transfer energy to the house 104 and may determine the vehicle range based on the vehicle availability. For example, if the vehicle 102 may be available for only two hours to provide energy to the house 104 to operate the HVAC system, the system may determine the vehicle range based on the input that the vehicle 102 may transfer energy to the house 104 for only two hours. In some aspects, the system may receive the information associated with vehicle availability from the user via the vehicle 102 or a user device. In other aspects, the system or the vehicle 102 may itself predict vehicle availability based on historical vehicle travel, usage and energy transfer pattern.

Responsive to determining the vehicle range, the system may transmit/output the vehicle range on a user interface. In some aspects, the user interface may be associated with the thermostat, the user device or a vehicle Human-Machine Interface (HMI). The system may additionally cause the user interface to output the set point temperature input by the user on the thermostat. The user may view the set point temperature and the vehicle range on the user interface and may modify the set point temperature (e.g., increase or decrease the set point temperature) based on user's vehicle range requirements. Responsive to the user modifying the set point temperature, the vehicle range output on the user interface may also get modified based on the new set point temperature input by the user. In some aspects, the user interface may enable the user to modify the set point temperature on the user interface itself, as described later in the description below in conjunction with FIGS. 3 and 4.

In some aspects, the user may also "preset" the maximum amount of energy that may be transferred from the vehicle 102 to the house 104 to operate the HVAC system, or a minimum vehicle range that may be acceptable to the user, or a time duration (e.g., a start time and/or an end time) for which the vehicle 102 may transfer the energy to the house 104 to operate the HVAC system. The system may automatically control HVAC system operation via the thermostat and/or energy transfer from the vehicle 102 based on the preset information described above. For example, the system may automatically disable energy transfer from the vehicle 102 and/or increase the set point temperature via the thermostat when the determined estimated amount of energy required to be drawn from the vehicle 102 to operate the HVAC system may be greater than the preset maximum amount of energy. Similarly, the system may automatically disable energy transfer from the vehicle 102 and/or increase the set point temperature via the thermostat when the estimated vehicle range may be less than the preset minimum vehicle range. The system may further automatically trigger or activate energy transfer from the vehicle 102 to the house 104 at the start time described above and may deactivate energy transfer at the end time.

In some aspects, the system may further communicatively couple with a second vehicle (shown as vehicle 202 in FIG. 2) that may be configured to transfer energy to the house 104 to operate the HVAC system, either independently or along with the vehicle 102. Similar to obtaining the vehicle information associated with the vehicle 102 from the vehicle 102, the system may obtain vehicle information associated with the second vehicle (or "second vehicle information", which may be similar to the vehicle information associated with the vehicle 102) from the second vehicle. The system may further obtain a split of energy transfer to the house 104 between the vehicle 102 and the second vehicle from the user interface associated with the vehicle 102, the second vehicle, the user device or the thermostat. In some aspects, the user may input the split on the user interface, or the system may itself determine the split based on user preferences/requirements. As an example, the split may indicate that 40% of the amount of energy required to operate the HVAC system should be drawn from the vehicle 102 and the remaining 60% energy should be drawn from the second vehicle, when both the vehicle 102 and the second vehicle provide energy to the house 104 to operate the HVAC system.

Responsive to obtaining the second vehicle information and the split, the system may determine an estimated remaining vehicle range associated with the second vehicle in the same manner as described above. The system may then output the vehicle ranges associated with the vehicle 102 and the second vehicle and the split on the user interface. The user may then view respective vehicle ranges associated with the vehicle 102 and the second vehicle and may modify the set point temperature and/or the split when the user desires more or less vehicle range for one or both of the vehicle 102 and the second vehicle.

Further details of the system are described below in conjunction with FIG. 2.

The vehicle 102, the system and the second vehicle implement and/or perform operations, as described here in the present disclosure, in accordance with the owner manual and safety guidelines. In addition, any action taken by the user based on recommendations or notifications provided by the vehicle 102, the system and/or the second vehicle should comply with all the rules specific to the location and operation of the vehicle 102 and the second vehicle (e.g., Federal, state, country, city, etc.). The recommendation or notifications, as provided by the vehicle 102, the system and/or the second vehicle should be treated as suggestions and only followed according to any rules specific to the location and operation of the vehicle 102 and the second vehicle.

Figure 2:
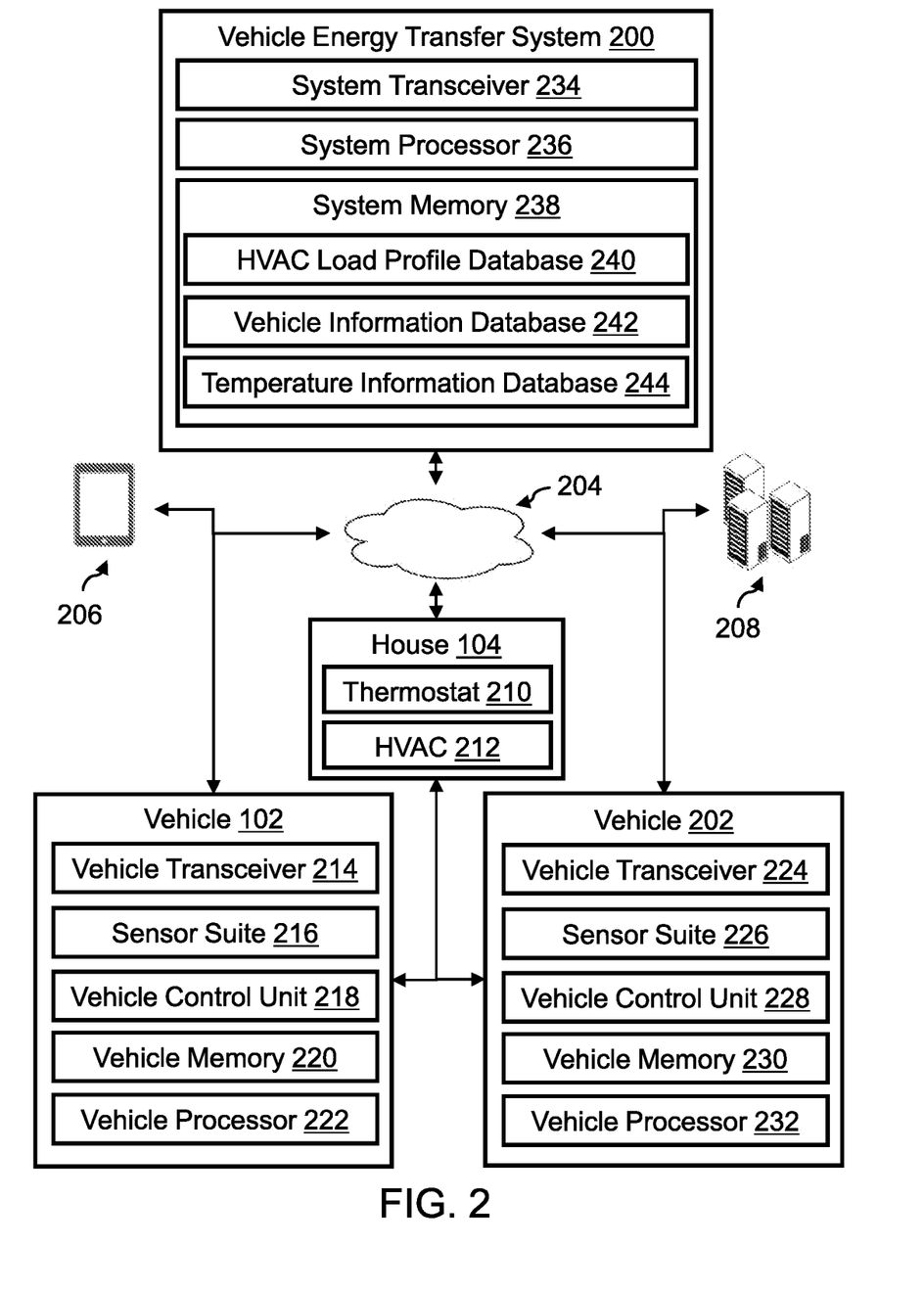
FIG. 2 depicts a block diagram of an example vehicle energy transfer system to enable energy transfer from one or more vehicles to a building in accordance with the present disclosure.

FIG. 2 depicts a block diagram of an example vehicle energy transfer system 200 (or system 200) to enable energy transfer from one or more vehicles 102, 202 to the house 104 in accordance with the present disclosure. The vehicle 202 may be same as the second vehicle described above, which may be configured to transfer energy to the house 104 either independently or along with the vehicle 102. FIG. 2 will be described in conjunction with FIGS. 3 and 4.

The system 200 may be communicatively coupled with the vehicle 102 and the vehicle 202 via a network 204. The system 200 may further be communicatively coupled with a user device 206, one or more servers 208 (or server 208), and a thermostat 210 and an HVAC system 212 (or HVAC 212) of the house 104, via the network 204.

The user device 206 may be associated with a vehicle owner or a house owner (who may be same or different). The user device 206 may include, but is not limited to, a mobile phone, a laptop, a computer, a tablet, a wearable device, or any other similar device with communication capabilities. The server 208 may be part of a cloud-based computing infrastructure and may be associated with and/or include a Telematics Service Delivery Network (SDN) that provides digital data services to the vehicles 102, 202 and other vehicles (not shown in FIG. 2) that may be part of a commercial vehicle fleet. In further aspects, the server 208 may be associated with a firm that supplies energy to the house 104 via a power grid. In this case, the server 208 may be communicatively coupled with the thermostat 210 and may obtain information associated with the house temperature, the set point temperature, and/or the like from the thermostat 210 at a predefined frequency. The server 208 may transmit the information obtained from the thermostat 210 to the system 200 at a predefined frequency. The server 208 may be further configured to store the HVAC load profile associated with the HVAC 212 and may transmit the HVAC load profile to the system 200 at a predefined frequency, or when the system 200 transmits a request to the server 208 to obtain the HVAC load profile. In additional aspects, the server 208 may be associated with a firm that provides weather related information to the system 200. In this case, the server 208 may transmit real-time ambient temperature of a geographical area where the house 104 may be situated to the system 200 via the network 204.

The network 204 illustrates an example communication infrastructure in which the connected devices discussed in various embodiments of this disclosure may communicate. The network 204 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The thermostat 210 may be configured to receive user's inputs associated with the set point temperature (as described above in conjunction with FIG. 1) and transmit the set point temperature to the system 200 via the network 204. The thermostat 210 may also be configured to measure the real-time house temperature and transmit the house temperature to the system 200, as described above. The thermostat 210 may be further configured to control HVAC operation (e.g., switch OFF or ON the HVAC 212) based on command signals received from the vehicles 102, 202 and/or the system 200.

The vehicle 102 may include a plurality of units including, but not limited to, a vehicle transceiver 214, a sensor suite 216, a vehicle control unit (VCU) 218, a vehicle memory 220 and a vehicle processor 222. The vehicle transceiver 214 may be configured to transmit/receive signals/information/data to/from external systems and devices via the network 204. For example, the vehicle transceiver 214 may transmit or receive information/signals to or from the vehicle 202 and the system 200, via the network 204. The sensor suite 216 may include one or more vehicle sensors including, but not limited to, ambient temperature sensor, sitting area sensors, vehicle cameras, and/or the like. The VCU 218 may control vehicle operational aspects and implement one or more instruction sets received from the vehicle processor 222 and/or the system 200. For example, the VCU 218 may activate or enable energy transfer from the vehicle 102 to the house 104 when the vehicle 102 may be connected to the charger point 106, based on command signals received from the system 200 via the vehicle transceiver 214. In a similar manner, the VCU 218 may deactivate energy transfer from the vehicle 102 to the house 104 based on command signals received from the system 200. The VCU 218 may be further configured to detect when the vehicle 102 may be connected to the charger point 106 and may transmit (via the vehicle transceiver 214) a trigger signal to the system 200 when the vehicle 102 connects to the charger point 106. The VCU 218 may be additionally configured to determine a real-time vehicle battery state of charge (SoC) level and transmit (via the vehicle transceiver 214) information associated with the SoC level to the system 200 at a predefined frequency or when the system 200 transmits a request to the vehicle 102 to obtain the SoC level.

The vehicle processor 222 may be disposed in communication with one or more memory devices disposed in communication with the respective computing systems (e.g., the vehicle memory 220 and/or one or more external databases not shown in FIG. 2). The vehicle processor 222 may utilize the vehicle memory 220 to store programs in code and/or to store data for performing aspects in accordance with the disclosure. The vehicle memory 220 may be a non-transitory computer-readable storage medium or memory storing a program code that enables the vehicle processor 222 to perform operations in accordance with the present disclosure. The vehicle memory 220 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the vehicle memory 220 may store historical driving/travel pattern associated with the vehicle 102, historical vehicle usage patterns, historical energy transfer pattern from the vehicle 102 to the house 104, and/or the like. The vehicle processor 222 may be configured to calculate/determine an estimated amount of vehicle energy required to travel a per-unit distance (e.g., one mile) based on the historical information stored in the vehicle memory 220 described above. The vehicle processor 222 may be further configured to determine availability information associated with the vehicle 102 to transfer energy to the house 104 to operate the HVAC 212 based on the historical information stored in the vehicle memory 220 described above. For example, the vehicle processor 222 may determine that the vehicle 102 may be available to transfer energy to the house 104 to operate the HVAC 212 between 7 PM to 10 PM on Mondays, based on historical energy transfer pattern from the vehicle 102 to the house 104. The vehicle processor 222 may be configured to transmit, via the vehicle transceiver 214, the determined estimated amount of vehicle energy required to travel a per-unit distance and the availability information to the system 200 at a predefined frequency or when the system 200 transmits a request to the vehicle 102 to obtain the information.

Similar to the vehicle 102, the vehicle 202 may include a plurality of units including, but not limited to, a vehicle transceiver 224, a sensor suite 226, a VCU 228, a vehicle memory 230 and a vehicle processor 232. The functions of the units of the vehicle 202 are same as the functions of respective units of the vehicle 102 and hence are not described again here for the sake of simplicity and conciseness.

The system 200 may include a plurality of units including, but not limited to, a system transceiver 234, a system processor 236 and a system memory 238. The system transceiver 234 may be configured to transmit/receive signals/information/data to/from external systems and devices including the vehicles 102, 202, the thermostat 210, the HVAC 212, the charger point 106, and/or the like.

The system processor 236 may be disposed in communication with one or more memory devices disposed in communication with the respective computing systems (e.g., the system memory 238 and/or one or more external databases not shown in FIG. 2). The system processor 236 may utilize the system memory 238 to store programs in code and/or to store data for performing aspects in accordance with the disclosure. The system memory 238 may be a non-transitory computer-readable storage medium or memory storing a program code that enables the system processor 236 to perform operations in accordance with the present disclosure. The system memory 238 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the system memory 238 may include a plurality of databases including, but not limited to, an HVAC load profile database 240, a vehicle information database 242 and a temperature information database 244. The HVAC load profile database 240 may store the HVAC load profile associated with the HVAC 212 that the system 200 may obtain from the vehicles 102, 202 or the server 208. The vehicle information database 242 may store vehicle information associated with the vehicles 102, 202 that the system 200 may obtain from respective vehicles. The vehicle information may include, for example, a real-time vehicle battery SoC level, an amount of vehicle energy required to travel per-unit distance and information associated with vehicle availability to transfer energy to the house 104 to operate the HVAC 212 ("availability information") associated with each of the vehicles 102 and 202. The temperature information database 244 may store the temperature information that the system 200 may obtain from the vehicles 102, 202, the thermostat 210 and/or the server 208. As described above, the temperature information may include the set point temperature associated with the house 104 input by the user on the thermostat 210, a real-time house temperature associated with the house 104 and the ambient temperature.

In operation, the system transceiver 234 may receive the HVAC load profile from the vehicles 102, 202 or the server 208, the temperature information from the vehicles 102, 202, the thermostat 210 and/or the server 208, and the vehicle information (including the availability information) associated with the vehicles 102, 202 from respective vehicles. Responsive to receiving the information described above, the system transceiver 234 may transmit the information to respective system memory databases for storage purpose.

When the user desires to transfer energy from the vehicle 102 (and/or the vehicle 202) to the house 104 to operate the HVAC 212, the user may electrically couple or connect the vehicle 102 to the charger point 106. Responsive to the user connecting the vehicle 102 to the charger point 106, the VCU 218 and/or the charger point 106 may transmit, via the network 204, a trigger signal to the system transceiver 234.

In further aspects, when the user desires to transfer energy from the vehicle 102 (and/or the vehicle 202) to the house 104 to operate the HVAC 212, the user may transmit an energy transmit request, via the user device 206, the server 208 or the vehicle 102, to the system transceiver 234. In this case, the system transceiver 234 may receive the trigger signal when the system transceiver 234 receives the energy transmit request. In some aspects, the user may also indicate an energy transfer start time (e.g., 7 PM on Monday) and/or an energy transfer end time (e.g., 10 PM) in the energy transmit request at which the user may desire the vehicle 102 to commence and stop transferring energy to the house 104.

The system processor 236 may obtain the trigger signal and/or the energy transmit request from the system transceiver 234. In some aspects, the system processor 236 may obtain the trigger signal from the system transceiver 234 when the system transceiver 234 receives the trigger signal from the VCU 218 and/or the charger point 106, or when the system transceiver 234 receives the energy transmit request. In other aspects, when the energy transmit request includes the energy transfer start time, the system processor 236 may receive the trigger signal from a system timer (not shown) at the energy transfer start time.

Responsive to obtaining the trigger signal, the system processor 236 may obtain the HVAC load profile, the temperature information and the vehicle information from respective system memory databases or directly from the system transceiver 234. The system processor 236 may then determine an estimated amount of energy required to operate the HVAC 212 based on the HVAC load profile and the temperature information. Stated another way, the system processor 236 may determine an amount of energy that may be required to be transferred from the vehicle 102 to the house 104 to operate the HVAC 212 (when the vehicle 102 may be electrically connected to the charger point 106 to transfer energy to the house 104 to operate the HVAC 212) based on the set point temperature input by the user on the thermostat 210, the real-time house temperature and the ambient temperature. In some aspects, the system processor 236 may further determine the estimated amount of energy based on a real-time power consumption of the house 104 that the system processor 236 may obtain from the charger point 106, the vehicle 102 and/or the server 208.

Responsive to determining the amount of energy described above, the system processor 236 may compare the amount of energy with a predefined energy threshold that may be pre-stored in the system memory 238. The predefined energy threshold may be indicative of a maximum amount of energy that the user may allow the vehicle 102 to transfer to the house 104. In this case, the user may have already transmitted the predefined energy threshold to the system 200 via the user device 206 or the vehicle 102, and the system 200 may have stored the predefined energy threshold in the system memory 238.

The system processor 236 may transmit, via the system transceiver 234, a notification to the user device 206 or a vehicle Human-Machine Interface (HMI, not shown) when the system processor 236 determines that the amount of energy may be greater than the predefined energy threshold based on the comparison described above. The notification may indicate to the user that the amount of energy is greater than the predefined energy threshold, and hence the user should increase the set point temperature so that the energy required to operate the HVAC 212 may drop below the predefined energy threshold (and hence the amount of energy described above may drop below the predefined energy threshold). In further aspects, the system processor 236 may transmit, via the system transceiver 234, a command signal (a first command signal) to the vehicle 102 to deactivate energy transfer to the house 104 when the system processor 236 determines that the amount of energy may be greater than the predefined energy threshold based on the comparison described above.

On the other hand, when the system processor 236 determines that the amount of energy may be less than the predefined energy threshold, the system processor 236 may calculate/estimate a remaining vehicle range associated with the vehicle 102 based on the amount of energy and the vehicle information associated with the vehicle 102. Stated another way, the system processor 236 may estimate the remaining vehicle range (or vehicle range) for the vehicle 102 based on the real-time battery SoC level, the amount of energy required to travel per-unit distance and the amount of energy required to operate the HVAC 212, when the amount of energy required to operate the HVAC 212 may be less than the predefined energy threshold. In some aspects, the system processor 236 may additionally estimate the remaining vehicle range based on the availability information associated with the vehicle 102. For example, if the vehicle 102 is available for only two hours to provide energy to the house 104 to operate the HVAC 212, the system processor 236 may estimate the vehicle range based on the input that the vehicle 102 may transfer energy to the house 104 for only two hours.

Responsive to estimating the vehicle range, the system processor 236 may compare the estimated vehicle range with a predefined range threshold (that may be pre-stored in the system memory 238 and provided by the user to the system 200). The predefined range threshold may be indicative of a minimum vehicle range for the vehicle 102 that may be acceptable to the user, when the vehicle 102 transfers energy to the house 104 to operate the HVAC 212. For example, the user may provide a predefined range threshold of 180 miles to the system 200.

The system processor 236 may transmit, via the system transceiver 234, a notification to the user device 206 or the vehicle HMI when the system processor 236 determines that the vehicle range may be less than the predefined range threshold based on the comparison described above. The notification may indicate to the user that the vehicle range may be less than the predefined range threshold, and hence the user should increase the set point temperature so that the vehicle range may increase above the predefined range threshold. In further aspects, the system processor 236 may transmit, via the system transceiver 234, a command signal (a second command signal) to the vehicle 102 to deactivate energy transfer to the house 104 when the system processor 236 determines that the vehicle range may be less than the predefined range threshold based on the comparison described above.

Although the description above describes an aspect where the system processor 236 transmits notifications when the amount of energy may be greater than the predefined energy threshold or when the vehicle range may be less than the predefined range threshold, in some aspects, in addition to or alternative to transmitting the notifications, the system processor 236 may transmit a command signal (e.g., a third command signal) to the thermostat 210 to automatically increase the set point temperature. In this case, the system processor 236 may automatically increase the set point temperature so that the amount of energy may drop below the predefined energy threshold and/or the vehicle range may increase above the predefined range threshold.

Figure 3:
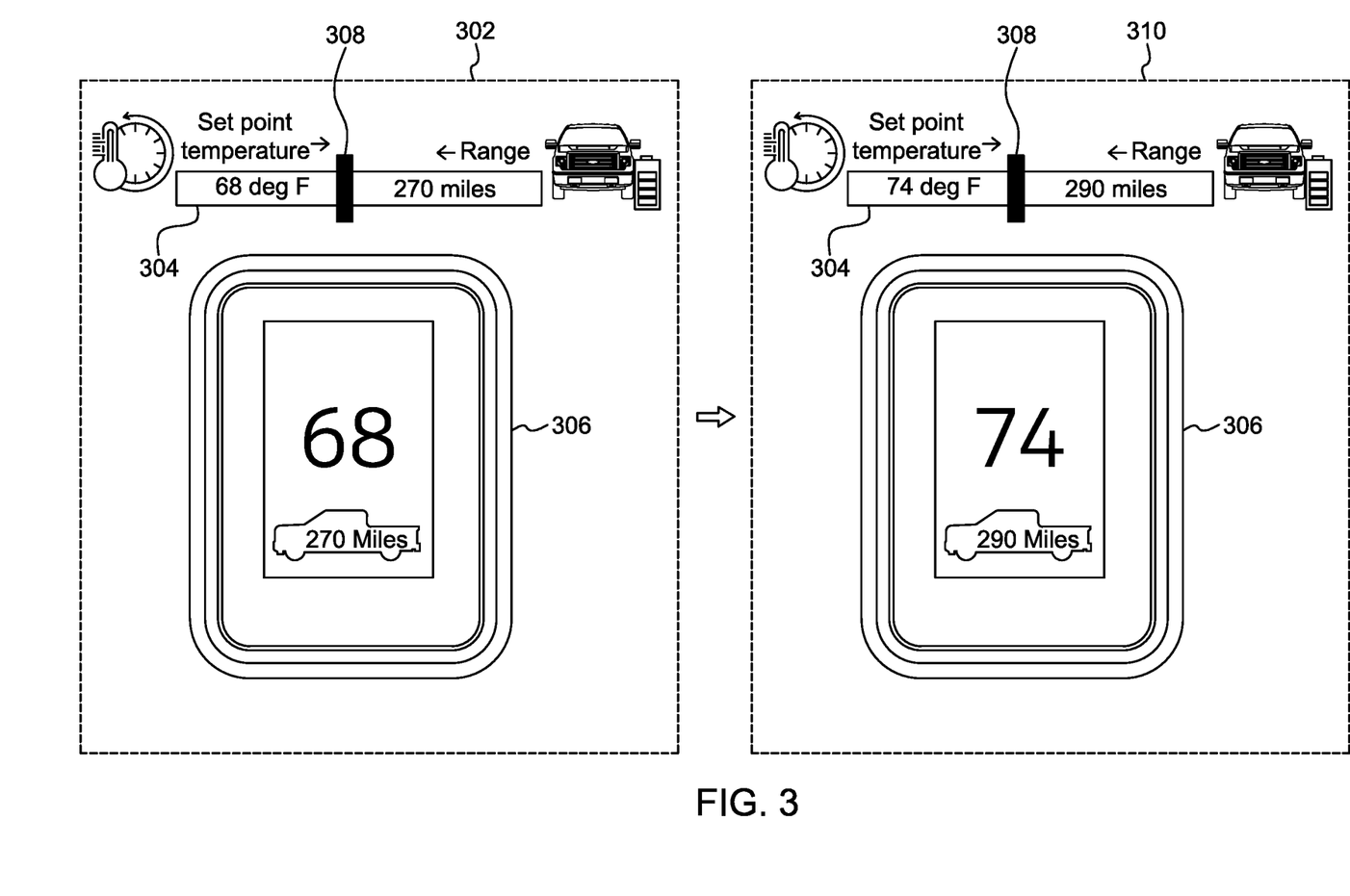
FIG. 3 depicts snapshots of an example user interface in accordance with the present disclosure.

Responsive to determining that the vehicle range may be greater than the predefined range threshold, the system processor 236 may transmit/output, via the system transceiver 234, the vehicle range to a user interface associated with the vehicle 102, the user device 206 and/or the thermostat 210. In some aspects, the system processor 236 may additionally transmit/output the set point temperature on the user interface, along with the vehicle range. An example user interface displaying the vehicle range and the set point temperature is shown in FIG. 3 as view 302.

As shown in the view 302, the user interface may display the set point and the vehicle range on a slide bar 304 and/or in the form of a graphical illustration 306. In some aspects, the slide bar 304 may include a slider 308 that may enable the user to modify the set point temperature by sliding the slider 308 in right or left direction (in this case, the user interface may be a touchscreen interface). As an example, if the user desires to have vehicle range more than "270 miles" shown in the view 302, the user may slide the slider 308 to the left direction to increase the set point temperature from 68 degrees Fahrenheit to 74 degrees Fahrenheit, as shown in view 310 of FIG. 3. In some aspects, the slider 308 may be replaced with a dial.

Responsive to the user sliding the slider 308, the system processor 236 may obtain a trigger or a user request to modify the set point temperature from a current set point temperature (e.g., 68 degrees Fahrenheit) to an updated set point temperature (e.g., 74 degrees Fahrenheit). The system processor 236 may then calculate an updated vehicle range (e.g., 290 miles) based on the updated set point temperature in the same manner as described above and may output the updated vehicle range on the user interface as shown in the view 310. In addition to outputting the updated vehicle range, the system processor 236 may transmit a command signal (e.g., a fourth command signal) to the thermostat 210 to modify the set point temperature to the updated set point temperature and operate the HVAC 212 based on the updated set point temperature. In some aspects, the command signal may include the updated set point temperature.

As the vehicle 102 continues to transfer energy to the house 104, the system processor 236 may continuously update the vehicle range based on the real-time SoC level and the real-time temperature information (e.g., real-time house temperature and ambient temperature) and output the vehicle range on the user interface. The user may modify the set point temperature based on the displayed vehicle range by using the slider 308 at any time during the energy transfer operation of the vehicle 102.

In some aspects, when the house 104 may be obtaining energy from two vehicles simultaneously (e.g., simultaneously from the vehicle 102 and the vehicle 202 via the charger point 106), the system processor 236 may obtain vehicle information associated with both the vehicles 102, 202 from the system transceiver 234 or the vehicle information database 242. In addition, the system processor 236 may obtain information associated with a split of the total amount of energy being transferred to the house 104 to operate the HVAC 212, between the vehicle 102 and the vehicle 202. For example, the system processor 236 may obtain the split that indicates that 60% of the total amount of energy being transferred to the house 104 may be provided by the vehicle 102 and the remaining 40% may be provided by the vehicle 202. In some aspects, the system processor 236 may obtain the split from the user device 206, the vehicles 102, 202 or the server 208. In this case, the user may have input the split on the user device 206 or the vehicles 102, 202 or the split may be pre-stored on the server 208 (e.g., based on historical user preferences).

Responsive obtaining the split, the system processor 236 may determine a first amount of energy being transferred by the vehicle 102 to the house 104 (e.g., 60% of the total amount of energy) and a second amount of energy being transferred by the vehicle 202 to the house 104 (e.g., 40% of the total amount of energy) based on the split. The system processor 236 may then determine a remaining vehicle range (e.g., a "first vehicle range") associated with the vehicle 102 based on the first amount of energy and the vehicle information associated with the vehicle 102. Similarly, the system processor 236 determine a remaining vehicle range (e.g., a "second vehicle range") associated with the vehicle 202 based on the second amount of energy and the vehicle information associated with the vehicle 202.

Figure 4:
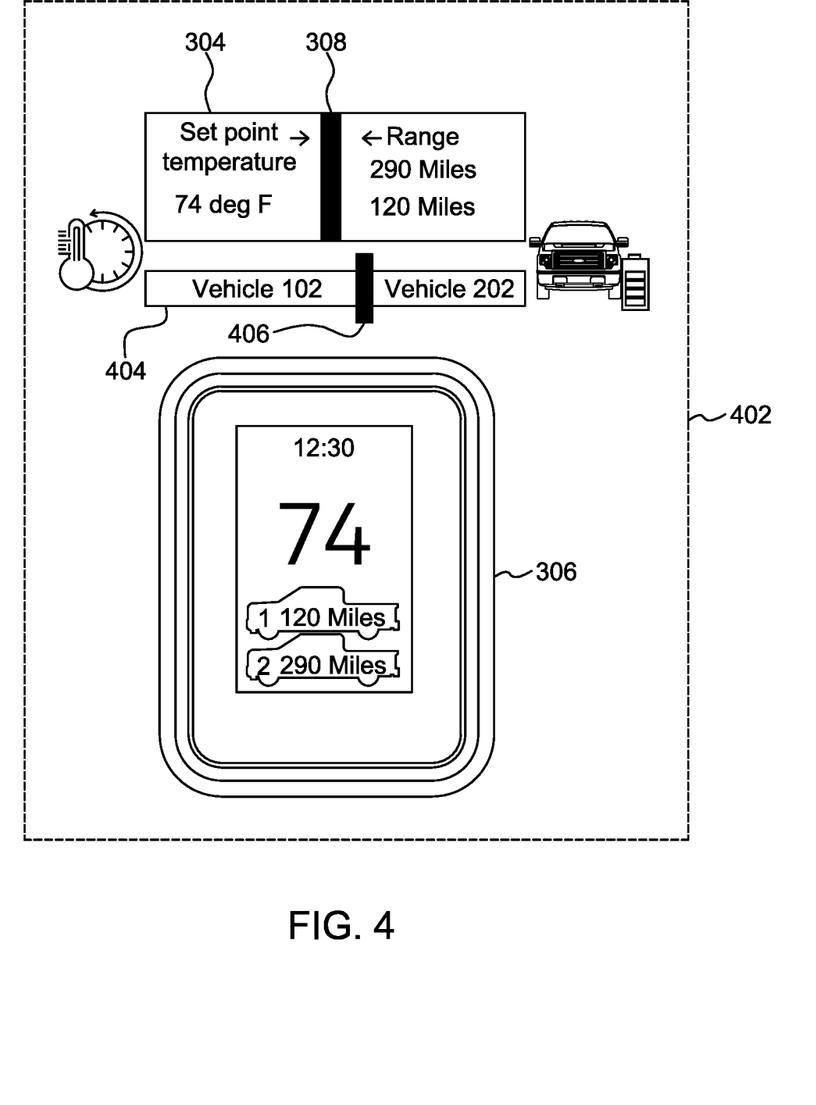
FIG. 4 depicts a snapshot of another example user interface in accordance with the present disclosure.

Responsive to determining the first vehicle range and the second vehicle range, the system processor 236 may transmit/output the first vehicle range and the second vehicle range, along with the set point temperature, to the user interface as shown in view 402 of FIG. 4. The system processor 236 may further transmit/output the split on a slide bar 404 including a slider 406. The slide bar 304 and the graphical illustration 306 may display both the first vehicle range and the second vehicle range.

When the user desires to modify the first vehicle range and/or the second vehicle range, the user may slide right or left the slider 308, as described above. The user may additionally slide the slider 406 left or right to modify the split. Responsive to the user sliding the slider 406, the system processor 236 may obtain the user request to modify the split to an updated split. The system processor 236 may then transmit, via the system transceiver 234, command signals to the vehicle 102 and the vehicle 202 to modify the amounts of energy being transferred by the respective vehicles to the house 104 based on the updated split.

Although the description above describes an aspect where two vehicles (i.e., the vehicles 102 and 202) transfer energy to the house 104, in some aspects, more than two vehicles may also simultaneously transfer energy to the house 104 to operate the HVAC 212. In this case, the system 200 may display respective vehicle ranges of each vehicle and the split (totaling up to 100%) on the user interface in the same manner as described above.

Further, although the description above describes an aspect where the user updates the split based on the first vehicle range and the second vehicle range displayed on the user interface, in some aspects, the system 200 may automatically update the split (and/or the set point temperature) based on user preferences provided by the user to the system 200 via the user device 206 or the vehicles 102, 202. For example, if the user prefers that the vehicle range decrement rate should be same for both the vehicles 102, 202 (e.g., 1 mile decrement for each vehicle) when the vehicles 102, 202 may be transferring energy to the house 104, the system processor 236 may automatically update the split such that the vehicle range decrement rate may be same for both the vehicles 102, 202.

In other aspects, the user may provide inputs to the system 200 (e.g., via the user device 206 or the vehicles 102, 202) indicating the maximum vehicle range decrement rate that may be acceptable to the user. In this case, the system 200 may dynamically update the split (or cause the house 104 to obtain energy from the power grid) when the vehicle range decrement rate for any of the vehicles 102, 202 increases above the maximum vehicle range decrement rate. In this case, the user may additionally provide inputs to the system 200 indicating the source of energy (e.g., the power grid, the vehicle 102, or the vehicle 202) from where the house 104 may obtain the energy when the vehicle range decrement rate increases above the maximum vehicle range decrement rate.

The system 200 may further dynamically update the split based on information associated with historical usage of the vehicles 102, 202, expected usage profile of owners and/or drivers/operators associated with each vehicle 102, 202 (that may be stored in the system memory 238), and remaining battery SoC/range of each vehicle 102, 202. Responsive to dynamically updating the split, the system 200 may transmit command signals to the vehicle 102 and the vehicle 202 to modify the amounts of energy being transferred by the respective vehicles to the house 104 based on the updated split, as described above.

The system 200 and/or the user may additionally modify/update the split based on expected future vehicle usage for each vehicle 102, 202. For example, if the vehicle 102 is to be predominately used by the user for transportation, the user and/or the system 200 may dynamically update the split such that the vehicle 202 majorly or predominately transfers energy to the house 104 to operate the HVAC 212, and the vehicle 102 is used for energy transfer only when the vehicle 202 may not be able to meet the HVAC energy demands/requirements. In some aspects, the slider 406 may also incorporate a feature to update an amount or percentage of energy that the house 104 may obtain from the utility power source/power grid. In another exemplary aspect, when the vehicles 102, 202 may be electrically coupled with the charger point 106, the system 200 may dynamically update the split such that SoC levels or vehicle ranges of respective vehicles may equalize (or reach to the same level) before the vehicles 102, 202 simultaneously transfer energy to the house 104.

In additional aspects, by using the system 200, the user may control energy transfer operation from the vehicle 102 or the vehicle 202 to the house 104. For example, the user may input, via the user device 206 or the vehicle 102 (or the vehicle 202), that the user desires the set point temperature to be 68 degrees Fahrenheit and the vehicle range to be 200 miles at a future time (e.g., 7 AM in the morning or 2 hours from a current time). The system 200 may receive such user inputs and may accordingly control energy transfer from the vehicle 102 such that user preferred conditions are met at 7 AM in the morning or 2 hours from the current time.

In other aspects, the user may input that the conditions described above should be met within a predefined time duration (e.g., within 15 minutes). In this case too, the system 200 may control energy transfer from the vehicle 102 such that the user preferred conditions are met within 15 minutes of receiving the user inputs. In some aspects, instead of inputting 15 minutes, the user may also input the current time, indicating that the user desires the preferred conditions to be met immediately. In this case, the system 200 may increase energy transfer from the vehicle 102 such that the user preferred conditions are met immediately. In yet another aspect, the user may provide inputs such that the system 200 may "start" to control energy transfer operation from the vehicle 102 after a predefined time duration (e.g., 4 hours from the current time) and not immediately. In this case, the system 200 may not automatically or dynamically control energy transfer operation from the vehicle 102 until 4 hours have been elapsed.

Figure 5:
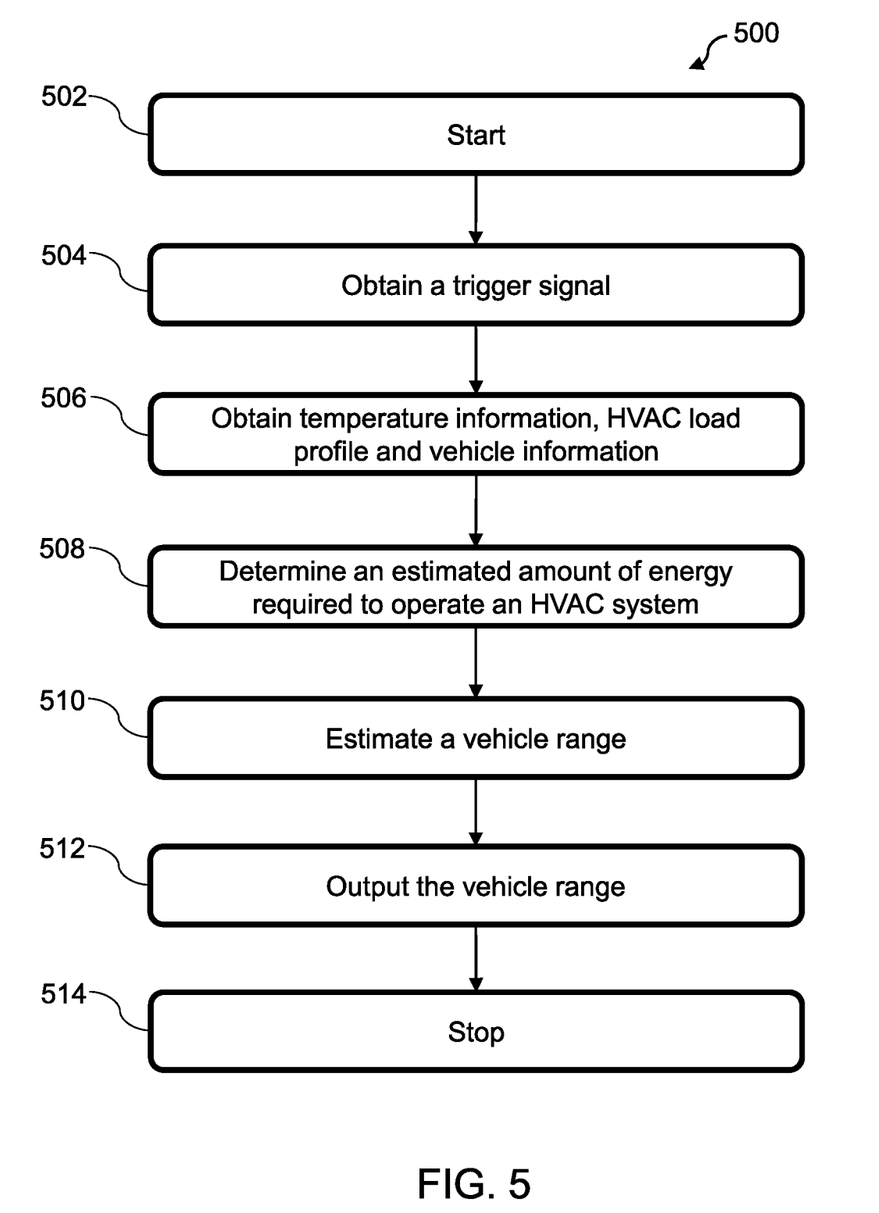
FIG. 5 depicts a flow diagram of an example first method for enabling energy transfer from a vehicle to a building in accordance with the present disclosure.

FIG. 5 depicts a flow diagram of an example first method 500 for enabling energy transfer from the vehicle 102 to the house 104 in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include obtaining, by the system processor 236, the trigger signal from the VCU 218, the user device 206, the server 208 or the system timer, as described above. At step 506, the method 500 may include obtaining, by the system processor 236, the temperature information, the HVAC load profile and the vehicle information associated with the vehicle 102.

At step 508, the method 500 may include determining, by the system processor 236, the estimated amount of energy required to operate the HVAC 212 based on the temperature information and the HVAC load profile. At step 510, the method 500 may include estimating, by the system processor 236, the vehicle range associated with the vehicle 102 based on the estimated amount of energy and the vehicle information associated with the vehicle 102. At step 512, the method 500 may include outputting, by the system processor 236, the vehicle range to the user interface.

At step 514, the method 500 may stop.

Figure 6:
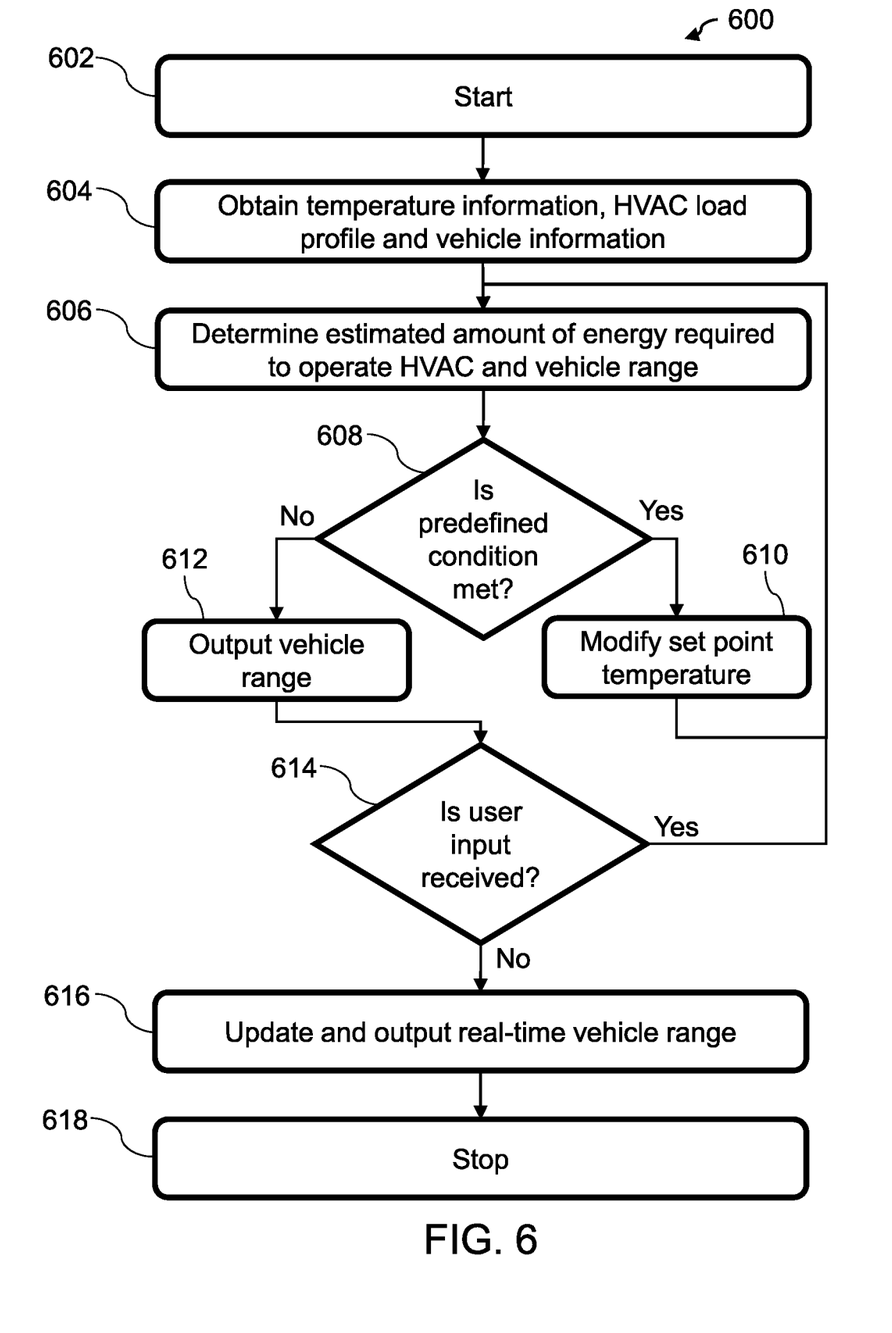
FIG. 6 depicts a flow diagram of an example second method for enabling energy transfer from a vehicle to a building in accordance with the present disclosure.

FIG. 6 depicts a flow diagram of an example second method 600 for enabling energy transfer from the vehicle 102 to the house 104 in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include obtaining, by the system processor 236, the temperature information, the HVAC load profile and the vehicle information associated with the vehicle 102. At step 606, the method 600 may include determining, by the system processor 236, the estimated amount of energy and the vehicle range based on the obtained temperature information, the HVAC load profile and the vehicle information, as described above.

Responsive to determining the estimated amount of energy and the vehicle range, the system processor 236 may determine whether a predefined condition may be met at step 608. In some aspects, the predefined condition may be met when the estimated amount of energy may be greater than the predefined energy threshold and/or when the vehicle range may be less than the predefined range threshold. At step 610, the method 600 may include modifying (e.g., reducing), by the system processor 236, the set point temperature when the predefined condition may met at the step 608. In some aspects, when the predefined condition may be met at the step 608, the system processor 236 may transmit, via the system transceiver 234, the notification to the user device 206 or the vehicle 102, requesting the user to modify the set point temperature. In this case, the user may modify the set point temperature on the thermostat 210. Responsive to the set point temperature being modified at the step 610, the method 600 returns to the step 606.

On the other hand, when the predefined condition may not be met at the step 608, the method 600 may move to step

612. At step 612, the method 600 may include transmitting/outputting, by the system processor 236, the vehicle range to the user interface.

At step 614, the method 600 may include determining, by the system processor 236, whether user inputs are received to modify the set-point temperature (e.g., via the slider 308), responsive to outputting the vehicle range. If the user inputs are received, the method 600 may return to the step 606 where the estimated amount of energy and the vehicle range are re-calculated based on the modified/updated set-point temperature.

On the other hand, the method 600 moves to step 616 when the user inputs may not be received at the step 414. At the step 616, the method 600 may include updating, by the system processor 236, the vehicle range based on the real-time SoC value and the real-time temperature information and outputting the updated vehicle range on the user interface. In some aspects, the system processor 236 may additionally output an expected end of charging event vehicle range at the set-point temperature (based on the availability information associated with the vehicle 102) on the user interface.

At step 618, the method 600 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
    a memory configured to store a load profile associated with a first building component of a building;
    a transceiver configured to receive temperature information and first vehicle information associated with a first vehicle configured to transfer energy to the building to operate the first building component; and
    a processor communicatively coupled with the transceiver and the memory, wherein the processor is configured to:
        obtain a trigger signal;
        obtain the temperature information, the load profile and the first vehicle information responsive to obtaining the trigger signal;
        determine an estimated amount of energy required to operate the first building component based on the temperature information and the load profile;
        estimate a first vehicle range based on the estimated amount of energy and the first vehicle information; and
        output the first vehicle range.

2. The system of claim 1, wherein the first building component is a heating, ventilation, and air conditioning (HVAC) system of the building.

3. The system of claim 1, wherein the temperature information comprises a set point temperature associated with the building, a real-time temperature associated with the building, and an ambient temperature.

4. The system of claim 3, wherein the transceiver receives the set point temperature and the real-time temperature from a second building component.

5. The system of claim 4, wherein the second building component is a building thermostat.

6. The system of claim 4, wherein the processor is further configured to:
 obtain a user request to modify the set point temperature to an updated set point temperature responsive to outputting the first vehicle range; and
 transmit a first command signal to the second building component to modify the set point temperature to the updated set point temperature responsive to obtaining the user request, wherein the first command signal comprises the updated set point temperature.

7. The system of claim 4, wherein the processor outputs the first vehicle range to a user interface associated with a user device, the first vehicle or the second building component.

8. The system of claim 1, wherein the transceiver receives the first vehicle information from the first vehicle, and wherein the first vehicle information comprises a real-time first vehicle battery state of charge (SOC) and a first vehicle energy required to travel a per-unit distance.

9. The system of claim 1, wherein the processor is further configured to:
 determine that the estimated amount of energy is greater than a predefined energy threshold; and
 transmit a second command signal to the first vehicle to deactivate energy transfer from the first vehicle to the building responsive to determining that the estimated amount of energy is greater than the predefined energy threshold.

10. The system of claim 1, wherein the processor is further configured to:
 determine that the first vehicle range is less than a predefined range threshold; and
 transmit a third command signal to the first vehicle to deactivate energy transfer from the first vehicle to the building responsive to determining that the first vehicle range is less than the predefined range threshold.

11. The system of claim 1, wherein the processor obtains the trigger signal when the first vehicle is electrically coupled with the building to transfer energy to the building.

12. The system of claim 1, wherein the transceiver is further configured to receive a request to transfer energy from the first vehicle to the building, and wherein the processor obtain the trigger signal when the transceiver receives the request.

13. The system of claim 1, wherein the processor obtains the trigger signal from the first vehicle, a server, a user device or a system timer.

14. The system of claim 1, wherein the transceiver is further configured to receive second vehicle information associated with a second vehicle configured to transfer energy to the building to operate the first building component, and wherein the processor is further configured to:
 obtain a split of the estimated amount of energy transferred by the first vehicle and the second vehicle to the building to operate the first building component;
 determine a first amount of energy transferred from the first vehicle to the building and a second amount of energy transferred from the second vehicle to the building based on the split;
 determine a second vehicle range associated with the first vehicle based on the first amount of energy and the first vehicle information;
 determine a third vehicle range associated with the second vehicle based on the second amount of energy and the second vehicle information; and
 output the second vehicle range and the third vehicle range.

15. The system of claim 14, wherein the second vehicle information comprises a real-time second vehicle battery state of charge (SOC) and a second vehicle energy required to travel a per-unit distance.

16. The system of claim 14, wherein the processor is further configured to:
 obtain a user request to modify the split to an updated split; and
 transmit command signals to the first vehicle and the second vehicle to modify amounts of energy transferred from the first vehicle and the second vehicle to the building based on the updated split.

17. The system of claim 14, wherein the processor is further configured to:
 update the split based on at least one of information associated with historical usage of the first vehicle and the second vehicle, expected usage profiles of vehicle operators associated with the first vehicle and the second vehicle, and remaining vehicle ranges associated with the first vehicle and the second vehicle; and
 transmit command signals to the first vehicle and the second vehicle to modify amounts of energy transferred from the first vehicle and the second vehicle to the building based on the updated split.

18. The system of claim 1, wherein the transceiver is further configured to receive an availability information associated with the first vehicle to transfer energy to the building to operate the first building component, and wherein the processor is further configured to estimate the first vehicle range based on the availability information.

19. A method for enabling energy transfer from a vehicle to a building, the method comprising:
 obtaining, by a processor, a trigger signal;
 obtaining, by the processor, temperature information, a load profile associated with a building component of the building and vehicle information associated with the vehicle responsive to obtaining the trigger signal, wherein the vehicle is configured to transfer energy to the building to operate the building component;
 determining, by the processor, an estimated amount of energy required to operate the building component based on the temperature information and the load profile;
 estimating, by the processor, a vehicle range based on the estimated amount of energy and the vehicle information; and
 outputting, by the processor, the vehicle range.

20. A non-transitory computer-readable storage medium having instructions stored thereupon which, when executed by a processor, cause the processor to:
 obtain a trigger signal;
 obtain temperature information, a load profile associated with a building component of a building and vehicle information associated with a vehicle responsive to obtaining the trigger signal, wherein the vehicle is configured to transfer energy to the building to operate the building component;

determine an estimated amount of energy required to operate the building component based on the temperature information and the load profile;

estimate a vehicle range based on the estimated amount of energy and the vehicle information; and output the vehicle range.

* * * * *